United States Patent [19]

Brink

[11] 4,014,175

[45] Mar. 29, 1977

[54] CABLE AND PIPE LAYING MACHINE

[76] Inventor: Douglas F. Brink, P.O. Box 1186, Rapid City, S. Dak. 57701

[22] Filed: May 5, 1975

[21] Appl. No.: 574,321

[52] U.S. Cl. .................................. 61/72.6; 37/193
[51] Int. Cl.² .......................................... F16L 1/00
[58] Field of Search ............... 61/72.6, 72.5, 72.7, 61/72.1; 37/193; 180/134, 136, 139, 51

[56] References Cited

UNITED STATES PATENTS

| | | | |
|---|---|---|---|
| 3,122,850 | 3/1964 | Rockwell | 180/139 X |
| 3,417,571 | 12/1968 | Kelley | 61/72.6 |
| 3,421,329 | 1/1969 | Kinnan | 61/72.6 |
| 3,815,683 | 6/1974 | Collin, Jr. et al. | 37/193 |

*Primary Examiner*—Jacob Shapiro
*Attorney, Agent, or Firm*—Clarence A. O'Brien; Harvey B. Jacobson

[57] ABSTRACT

A cable or pipe laying machine for underground placement of cable or pipe incorporating a basic frame and power unit incorporating a front powered tractive component and a rear powered tractive component with the front and rear components being articulately interconnected for steering control of the machine and the rear component including a drawbar assembly and a cable or pipe laying plow associated therewith. The front and rear components each or both may be provided with cable or pipe reels and guide structures for guiding the cable or pipe to the plow. The machine may be formed by converting an existing scraper unit to a cable and pipe laying machine by a unique method including removal of the scraper structure and addition of cable reel mounting structures, guides, cable laying plow and controls at the upper portion of the rear tractive component.

6 Claims, 7 Drawing Figures

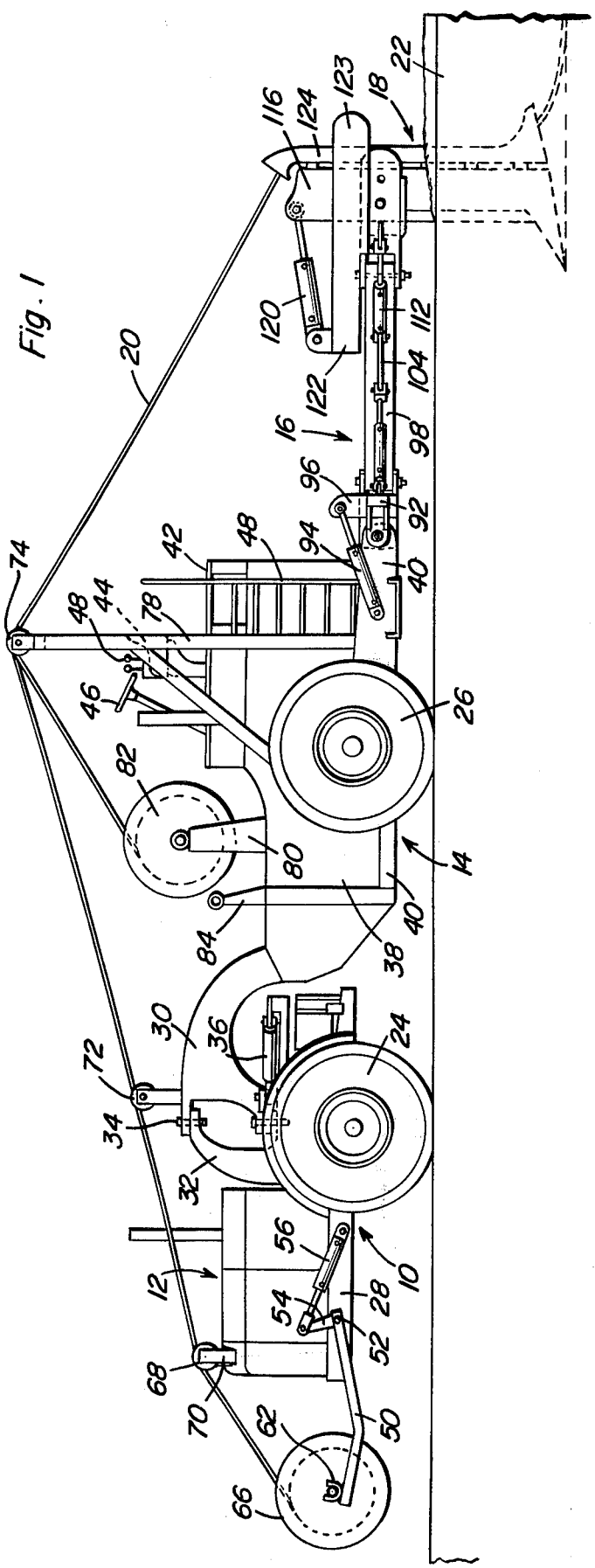
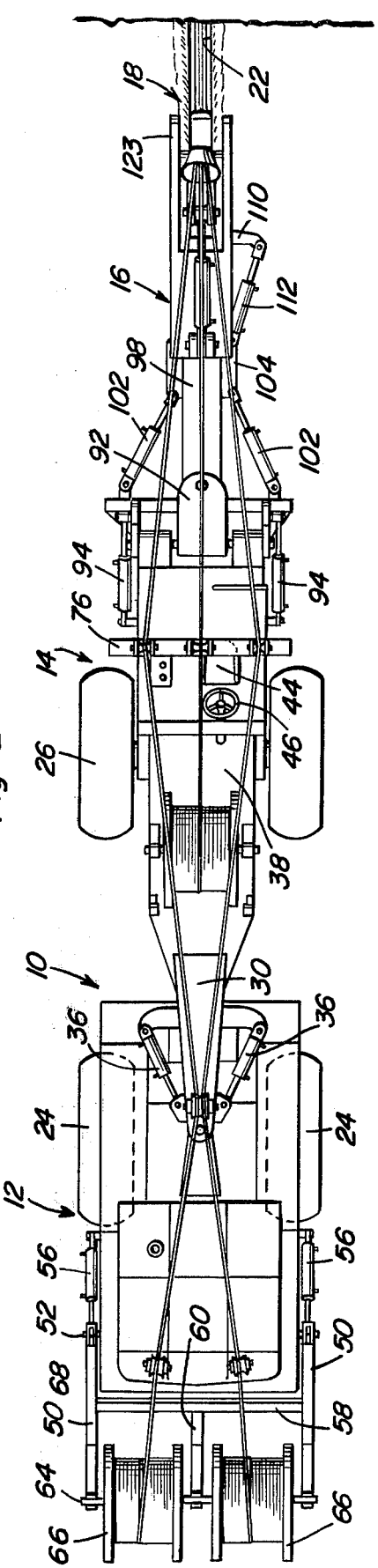

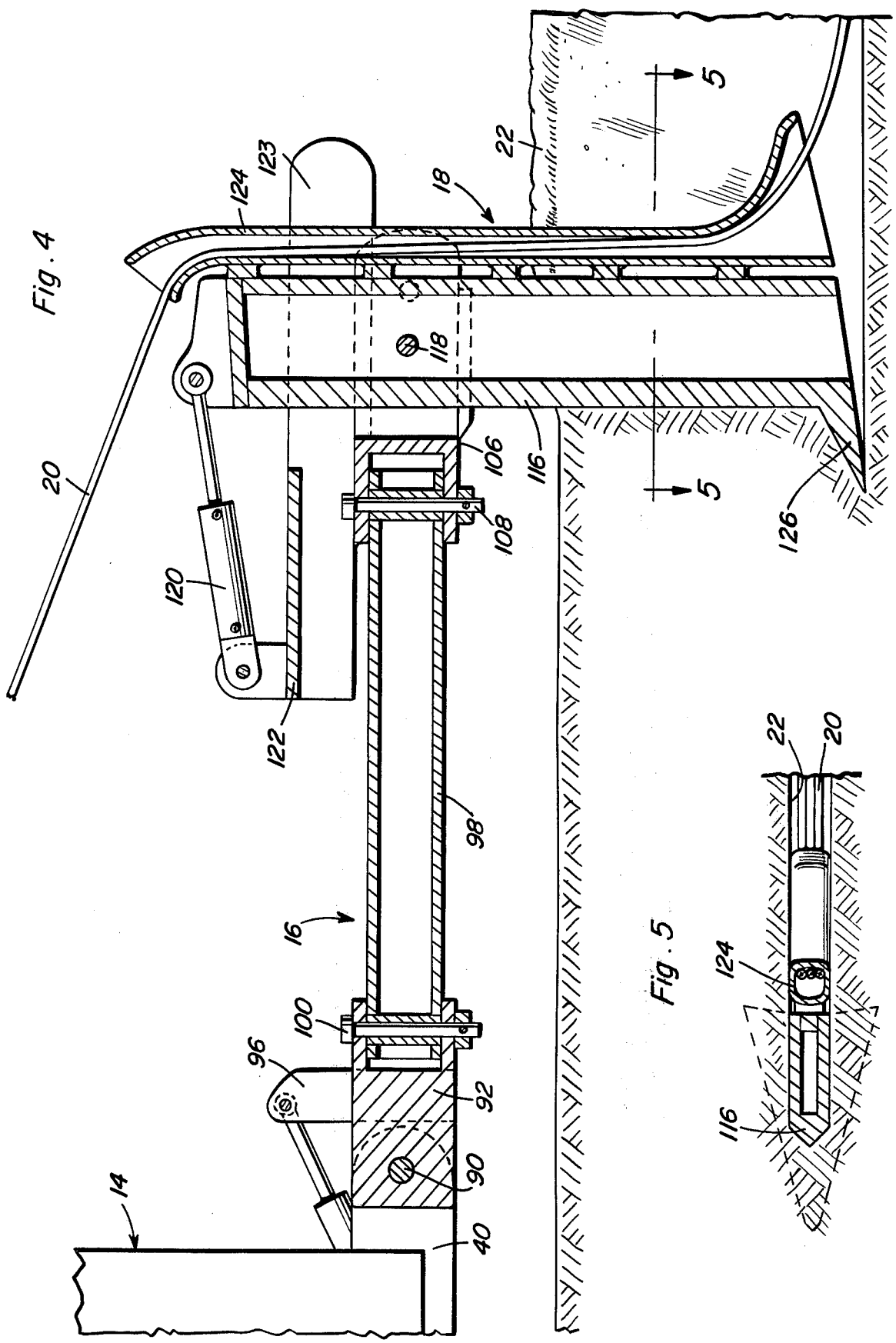

CABLE AND PIPE LAYING MACHINE

BACKGROUND OF THE INVENTION

1. Field of the Invention

The present invention generally relates to a machine for laying underground pipe, cable, lines or the like and includes an articulately connected frame in the form of a front powered tractive unit and a rear powered tractive unit having a drawbar and cable laying plow connected thereto and an operating control assembly mounted thereon to enable observation of the cable laying operation by the operator of the machine.

2. Description of the Prior Art

Cable and flexible pipe or line laying machines are well known and employ a tractor type vehicle having a cable reel or reels mounted thereon and a cable laying plow towed thereby. The vehicle used frequently is in the form of a crawler-type tractor utilizing the superior traction qualities of such a vehicle to provide sufficient force to pull the cable laying plot through the ground. When moving such vehicles from one site to another, it is usually necessary to load the vehicle onto a transporting trailer for over-the-road movement. Also, the characteristics of the terrain and the forces necessary to pull the cable plow through the ground sometimes exceed the capabilities of such a vehicle in which event two such vehicles are connected in tandem with the second vehicle being used merely to add traction force to the cable laying plow. Many patents exist relating to cable laying plows and machines for laying cable with the following U.S. Pat. Nos. illustrating the state of this art. Nos. 1,863,671, June 21, 1932; 3,032,903, May 8, 1962; 3,037,357, June 5, 1962; 3,140,745, July 14, 1964; 3,170,300, Feb. 23, 1965; 3,232,358, Feb. 1, 1966; 3,348,383, Oct. 24, 1967; 3,431,741 Mar. 11, 1969; 3,608,322, Sept. 28, 1971; 3,747,357, July 24, 1973.

SUMMARY OF THE INVENTION

An object of the present invention is to provide a cable and pipe laying machine employing a towing vehicle having a drawbar assembly and cable laying plow adjustably connected thereto with the vehicle including front and rear, articulately connected power units having an operator's station on the top portion of the rear powered unit and cable reel supporting assemblies on both the front and rear units for respectively laying single or multiple cables, pipes, lines or the like.

Another object of the invention is to provide a machine in accordance with the preceding object in which both the front and rear powered units are provided with pneumatic tires on the ground-engaging wheels to facilitate over-the-road movement from site-to-site at a relatively high speed as compared with a crawler-type tractor.

A further object of the invention is to provide a machine in accordance with the preceding objects in which the operator is oriented above the rear power unit and in a position to easily observe the cable laying operation with control of the direction of movement of the vehicle being obtained by varying the angular attitude between the front and rear power units about substantially a vertical axis.

Yet another important object of the present invention is to provide a cable and pipe laying machine which utilizes the basic structure incorporated into existing scraper machines with the scraping structure being omitted therefrom which materially increases the length of cable which can be laid underground in a given period of time and eliminates the necessity of employing two tractors to pull the cable laying plow.

These together with other objects and advantages which will become subsequently apparent residue in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the cable and pipe laying machine of the present invention.

FIG. 2 is a top plan view of the machine.

FIG. 4 is a longitudinal, sectional view, taken substantially upon a plane passing along section line 4—4 of FIG. 3 illustrating the structural details of the cable laying plow.

FIG. 5 is a transverse, sectional view taken substantially upon a plane passing along section line 5—5 of FIG. 4 illustrating further details of the plow.

DESCRIPTION OF THE PREFERRED EMBODIMENTS

Figure 3:
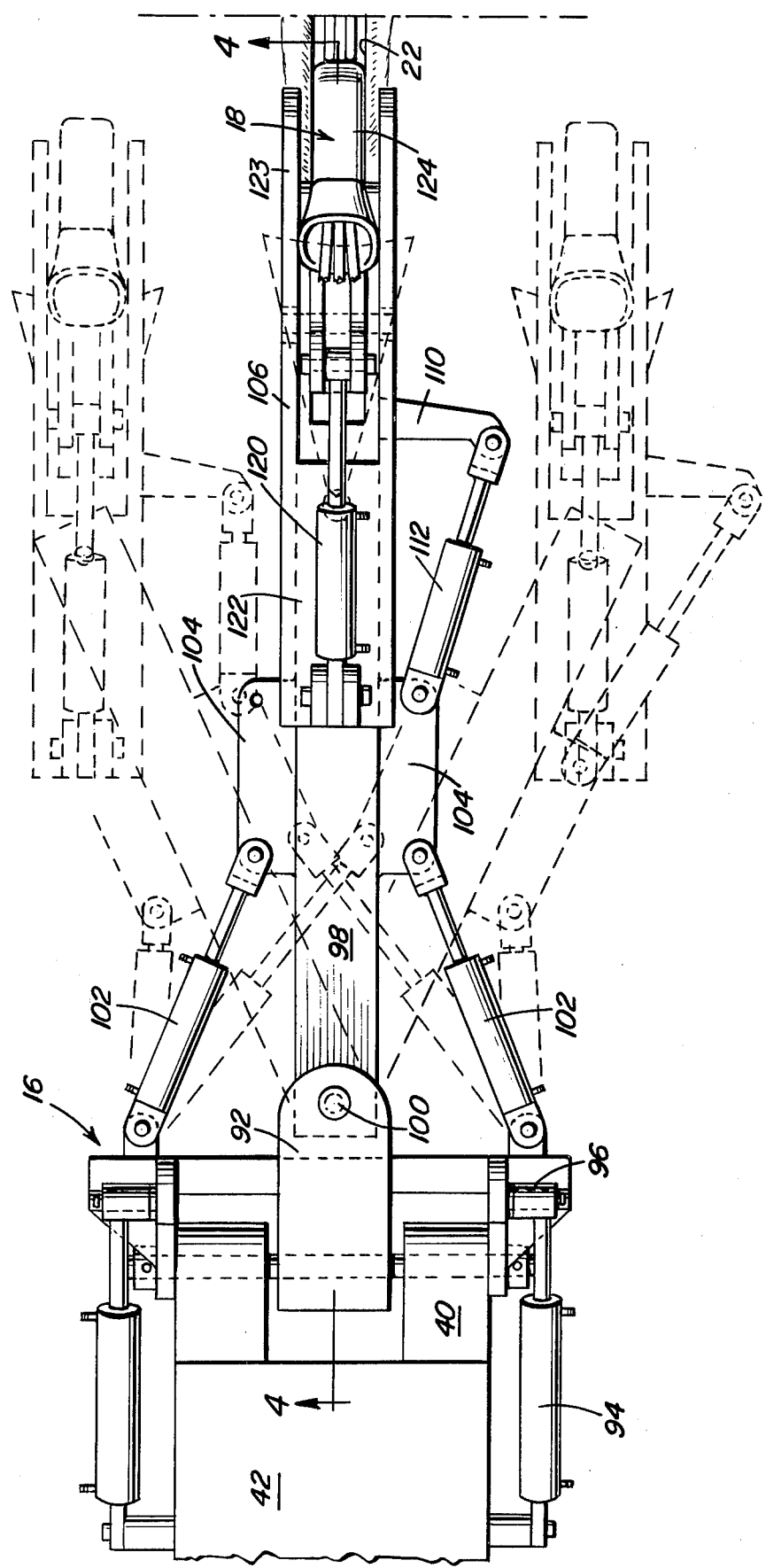
FIG. 3 is a top plan view of the drawbar and plow assembly illustrating the manner in which the drawbar and plow may be adjusted laterally of the machine.

Referring now specifically to the drawings, the cable and pipe laying machine of the present invention is generally designated by the numeral 10 and includes a front powered unit or tractive component generally designated by numeral 12 and a rear powered unit or tractive component generally designated by the numeral 14 to which is connected a drawbar assembly generally designated by numeral 16 and a cable laying plow assembly generally designated by the numeral 18 by which single or multiple cables, flexible pipes, lines or the like 20 may be laid into a slit or trench formed in the ground surface 22 in a well known manner as the vehicle traverses the ground surface.

Each of the powered units includes a pair of driven ground-engaging wheels 24 and 26 which are equipped with lugged pneumatic tires and each unit includes a prime mover such as an internal combustion engine and associated components to provide drive torque to the wheels 24 and 26. The prime mover may be in the form of a diesel engine provided with appropriate coolant systems, transmission, lubrication facilities, fuel supplying facilities, air induction facilities and the like which are necessary for proper operation of the prime mover. The front powered unit 12 has the wheels 24 mounted adjacent the rear thereof with a forwardly extending frame 28 being provided thereon and being unsupported by any front wheels with the steering control of the vehicle being provided by relative rotational movement of the drive wheels 24 on each side of the front unit. The rear unit 14 is provided with a forwardly projecting gooseneck 30 pivoted to a yoke 32 on the forward unit 12 by vertical pivot members 34 which define a vertical axis of articulation between the forward and rear powered units 12 and 14 with the angular relationship between the forward and rear units about the vertical axis being controlled by hydraulically actuated piston and cylinder assemblies 36 by which the forward unit 12 can pivot both to the right and left about the vertical axis approximately 90 degrees. The yoke 32 is connected to the forward unit for pivotal movement about a transverse axis to enable articulation over uneven terrain. This type of structure is in and of itself well known in existing earth-moving or scraping equipment in which the rear component is provided with a horizontal scraper blade and bucket by which dirt may be picked up at one location and moved to and spread at another location. One example of the existing type of scraper which uses this type of front and rear powered units is manufactured by General Motors Corporation and identified by the code mark "Terex".

In converting an existing scraper structure to a cable and pipe laying machine, the existing earth-carrying bucket on the rear powered unit 14 is cut out and a metal plate assembly 38 is welded between the gooseneck 30 and the frame structure 40 of the rear powered unit 14 with a portion of this space being occupied by the fuel tank for the internal combustion engine on the rear powered unit 14. The metal plate structure is rigidly welded to the frame 40 and suitable reinforcements may be provided by welding the frame components and metal plates in a well known manner. Although the above mentioned scraper is used for the purpose of making a cable and pipe laying machine, other well known and commercially available scrapers may be employed for this purpose in which the scraper and earth-moving capability of the device is removed by removing the bucket structure including the ejector and the bowl, cutting edge thereon and closure apron at the front end of the bucket. In addition, the rear component 14 has been modified by relocation of the fuel tank in the area defined by the plates 38 and an operator's platform 42 is mounted atop the internal combustion engine with the platform including an operator's seat 44, a steering control wheel 46 and a plurality of manually actuated control valves 48 so that operation of the front and rear powered units, the hydraulic piston and cylinder assemblies 36 and the laying of the cable may be properly observed and controlled. An access ladder 48 is provided on the rear portion of the rear powered unit 14 to enable the operator to gain access to the platform 42. Thus, the speed, direction and other controls for the vehicle are provided at the operator's platform or station in accessible relation to the operator's seat 44 with the steering wheel 46 and other controls being normally provided on the front unit when the device is used as an earth mover and scraper. Thus, the controls for the vehicle are reoriented to the top surface portion of the rear powered unit 14 and additional controls are provided for the drawbar assembly 16 and the cable plow assembly 18.

The front unit 12 is provided with a pair of forwardly extending arms 50 which are pivotally attached to the frame 28 for pivotal movement about transversely aligned pivot pins 52. The rear ends of the arms 50 are provided with an upstanding member 54 to which is attached a hydraulic piston and cylinder assembly 56 at each side of the frame so that by extending and retracting the piston and cylinder assemblies, the arms 50 may be swung in a vertical plane. The arms 50 extend forwardly of the frame 28 and are interconnected by a brace member 58 and centrally of the brace member 58 is a central arm 60 with each of the arms 50 and the central arm 60 including an upwardly opening U-shaped saddle 62 thereon receiving a shaft or rod 64 which rotatably supports a pair of cable reels 66 for rotational movement about a transverse axis defined by the pipe or rod 64.

With this construction, the cable reels 66 may be lifted from a supporting surface and transported with the vehicle by properly extending and retracting the piston and cylinder assemblies 56. The cables 20 which are unwound from the reel 66 extend over guide rollers or pulleys 68 mounted on top of the forward end of the forward powered unit by brackets 70 and over a central pulley or guide assembly 72 adjacent the vertical axis between the front and rear units as illustrated in FIG. 2. The cables 20 then extend rearwardly and are supported by a plurality of guide rollers or pulleys 74 mounted on a top cross member 76 supported by upstanding supports 78 carried by the rearward portion of the rear powered unit 14 so that the cables 20 may then extend downwardly to the cable laying plow assembly 18.

Figure 7:
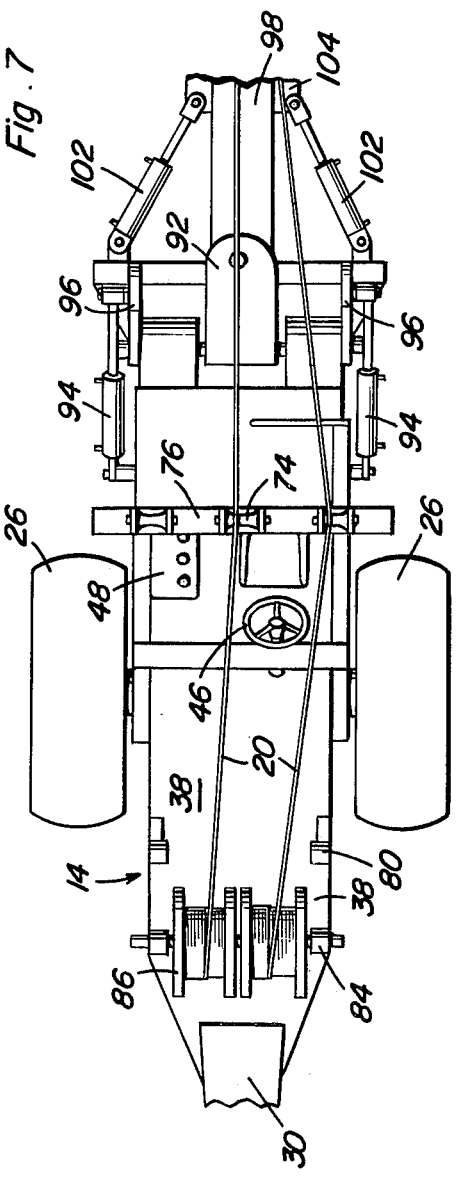
FIG. 7 is a partial plan view of the vehicle illustrating the use of multiple cable reels supported on the rear unit of the vehicle.

The rear powered unit 14 also includes upstanding brackets 80 adjacent the side portions of the welded plate structure 38 which supports a cable reel 82 thereon in which the cable from the cable reel 82 also passes over one of the guide rollers 74 adjacent the rear of the rear unit. Alternatively, as illustrated in FIG. 7, a pair of brackets 84 at a lower elevation and forwardly of the brackets 80 are provided for supporting a pair of reels 86 thereon thus enabling variation in the number of cables or lines supplied to the cable laying plow assembly 18.

With this arrangement, the supply reels for the cables, pipes, lines or the like are mounted on the front and/or rear powered units to increase the traction capabilities of the pneumatic tires. Also, orientation of the reels forwardly of the operator's control station enables the operator to visually observe the cables and the reels so that the amount of cable retained on the reels may be observed at any time to facilitate connecting the ends of cable segments together when installing underground cables, pipes and the like.

The drawbar assembly 18 includes a transversely extending shaft 90 interconnecting rearward extensions on the frame members 40 as illustrated in FIG. 3 and rotatably supporting a mounting adapter 92 for pivotal movement about the transverse axis of the shaft or pin 90 which is obtained by the use of hydraulically operated piston and cylinder assemblies 94 extending from the frame to the upper end portion of a pair of laterally spaced upstanding arms or tabs 96 attached rigidly to the adapter 92. An elongated plow boom 98 is pivoted to a pair of parallel lugs on the adapter 92 by a vertical pivot pin 100 with the boom being laterally swingably adjustable by the provision of hydraulic piston and cylinder assemblies 102 interconnecting the lower end of the arms 96 and brackets 104 welded or otherwise rigidly secured to the sides of the plow boom 98 in spaced relation to the vertical pin 100 so that by extending and contracting the piston and cylinder assemblies 102, the boom 98 may be swung horizontally about the vertical pivot pin 100 from the full line position illustrated in FIG. 3 to the broken line positions illustrated therein.

At the rear end of the plow boom 98, there is an adapter 106 which is attached to the boom 98 by a vertical pivot pin 108 which enables pivotal movement of the adapter 106 about a vertical axis 108. The adapter 106 is provided with an offset arm 110 having a hydraulic piston and cylinder assembly 112 connected thereto which also extends to and connects to the forward end of the bracket plate 104 so that by extending and contracting the piston and cylinder assembly 112, the adapter 106 may be angulated in relation to the boom 98 about vertical pivot pin 108 in the manner illustrated in FIG. 3.

The plow assembly 18 includes a vertical shank or plowshare 116 pivoted between rearwardly extending lugs on the adapter 106 by a transverse pivot pin 118. The upper end of the vertically disposed plowshare 116 is pivotally connected to a hydraulic piston and cylinder assembly 120 which has its forward end connected to a forwardly extending bracket 122 that is rigidly fixed to the adapter 106 by extending and contracting the piston and cylinder assembly 120. The bracket 122 has rearwardly projecting ends 123 which extend beyond the share and cable chute to serve as a push block in the event it becomes necessary to push the machine. The plowshare 116 may be pivoted in a vertical plane about the horizontal pivot axis defined by the pivot pin 118 to vary the orientation of the plowshare 116 in relation to the ground surface. A second hole 119 may be provided in the plowshare and share holder for receiving a bolt to lock the share 116 in fixed position in the event of failure of cylinder 120. As illustrated, the rear edge of the plowshare is provided with a hollow guide conduit or chute 124 thereon providing a suitable guide and retainer for guiding the cable 20 downwardly along the rear of the plowshare. The plowshare includes a forwardly and rearwardly extending bottom end portion 126 which structure is conventional in and of itself and forms no particular part of the present invention except that the plowshare including the lower end opens a slit-like trench 22 and deposits the cables, pipes, lines or the like 20 therein with the trench either being self-filling or filled by an appropriate packing device which forms no particular part of the present invention.

Figure 6:
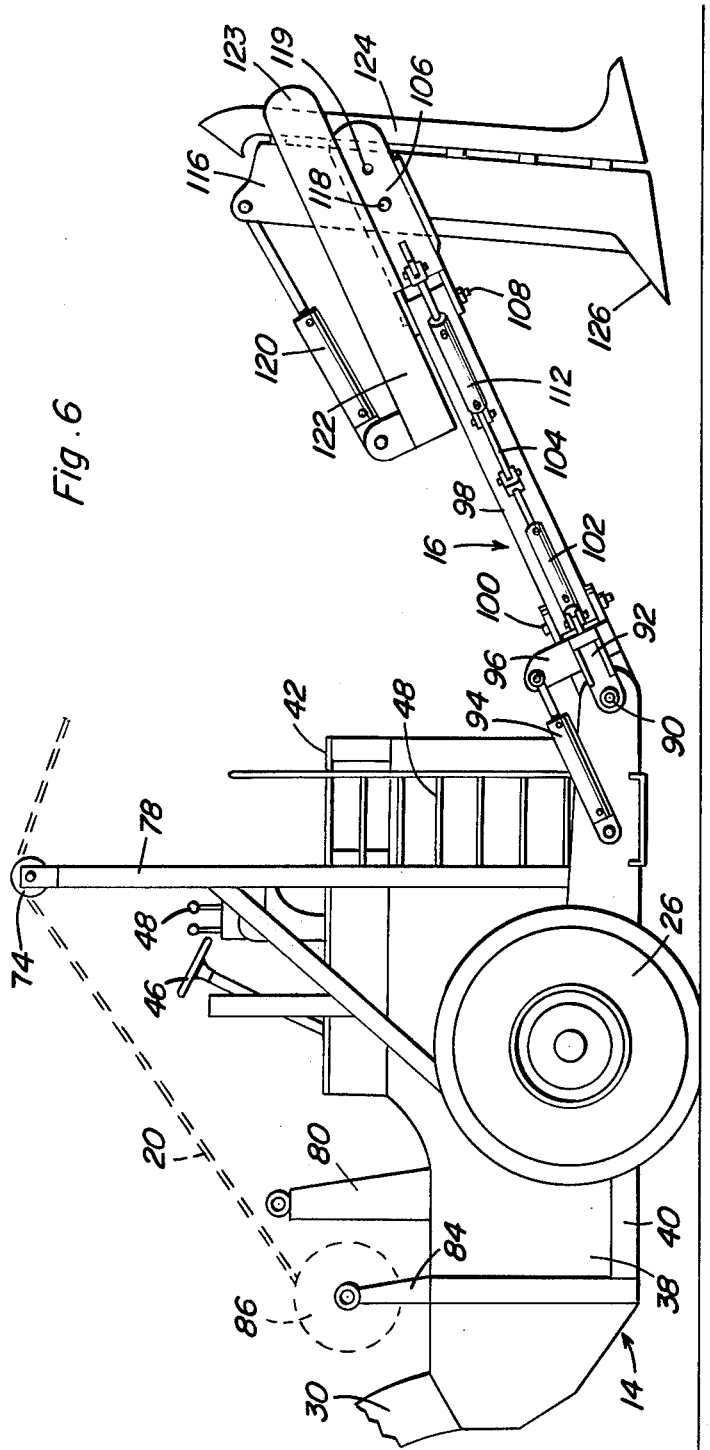
FIG. 6 is a side elevational view illustrating the drawbar and plow assembly in elevated condition.

FIG. 6 illustrates the elevated, inoperative position of the drawbar assembly and plow assembly so that the machine may be driven over the road at relatively high speeds, generally in the order of 30 mph thus greatly facilitating transport of the machine from one site to another. The use of the front and rear powered units which are articulately interconnected provides increased maneuverability.

The present invention can be used for direct underground burial of power lines, telephone lines, water lines and other similar flexible cables, conduits and the like. The device is unique because of the speed at which it can travel from one project to another without being transported by a separate vehicle and due to its high degree of maneuverability which is obtained by its 90 degree turn capability and its horsepower and weight. When a crawler tractor is moved from one project to another, the tractor would either have to be loaded onto a truck or similar vehicle or drive at a very slow speed. Various types of conventional cable plows may be employed including a vibrating or shaker type of plow. For example, a shaker plow may be attached to the boom by merely removing the pin 108 and attaching the shaker plow in lieu of the plow shown. One type of shaker plow which can be mounted on the boom 98 is a Parson's cable plow including the shaker unit and the share unit.

Another advantage of the present invention is the orientation of the operator which is moved from the original forward position on a conventional scraper unit to a platform above the rear engine. From here, the operator has good forward vision and excellent vision of the plow. The machine is operated completely from the platform by hydraulic controls and steering is the conventional hydraulic steering from the scraper unit. A section of the hydraulic controls will move cylinders which will raise and lower the front reel carrier thus eliminating the necessity of a hoist for loading such reels. The reel carriers mounted on the rear power unit 14 may be loaded by a hoist and the framework which supports the roller guides may be in the form of a protective roll cage which will protect the operator in the event the machine turns over. The plow boom is raised and lowered by the cylinder 94 on each side of the drawbar along with a tab or arm on each side of the adapter 96. The plow boom is preferably 8 feet in length from pivot pin to pivot pin which enables the rear of the boom or at least the plow to swing horizontally approximately 10 feet. The center portion of the plow boom being 8 feet in length provides for sufficient vertical movement to enable proper depth in crossing steep road ditches and the like. By putting the cylinders 112 in the float position, the plow can be steered from one side to the other using cylinder 102 or by putting cylinder 102 in float position, the plow can be steered from one side to the other using cylinders 112, with the cylinder 120 controlling the pitch at which the share 116 is held during plowing. The attitude of the toe 126 of the share penetrating the soil will vary with soil conditions for ease of plowing and acquiring proper depth. This machine will effectively plow at depths up to 48 inches in most soil conditions without the use of any additional push or tow vehicle thus materially increasing production over existing machines and under most conditions eliminating the necessity of employing a separate tow vehicle.

The boom is hydraulically controlled for movement in a vertical plane to elevate the cable plow or down crowd the cable plow and also to swing the boom horizontally, orient the plowshare about a vertical axis adjacent the rear of the boom and to vary the pitch of the plowshare about the horizontal axis which is formed by a pin 118 which should be the weakest anchor point so that it will shear in the event an obstruction is engaged by the plowshare.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A cable and pipe laying machine for direct underground burial of flexible cables, pipes, lines and the like comprising a front powered unit, a rear powered unit and means articulately interconnecting the front and rear powered units, each of said units including a prime mover and driven traction means, only said rear powered unit including an operator's station thereon by which the machine may be controlled, a drawbar assembly attached to the rear of the rear powered unit and a cable laying plow attached to said drawbar assembly in position for observation from the operator's station, said articulate connecting means including power means to vary the angular relation between the front powered unit and rear powered unit for steering control of the machine, said operator's station being disposed rearwardly of the interconnecting means to enable forward observation of the front unit and the angular relation between the units for effective steering control of the machine by a single operator, said drawbar assembly including an elongated boom, an adapter in the form of a body connected to the forward end of the boom by a vertical pivot pin to enable swinging movement of the boom about a vertical axis, transverse pin means connecting the body to the frame of the rear powered unit for pivotal movement about a transverse axis, said cable plow being connected to the rearward end of the boom, and an adapter in the form of a block interconnecting the rearward end of the boom and the cable plow, a vertical pin connecting the block to the boom to enable pivotal movement of the block about a vertical axis and a transverse pin connecting the cable plow to the block enable pivotal movement of the cable plow about a transverse horizontal axis, said cable plow including a vertically disposed share having guide means thereon for guiding a cable downwardly into a trench formed by the plowshare, and power operated means for varying the body, boom, block and cable plow about their various axes of movement.

2. The structure as defined in claim 1 wherein said cable plowshare includes a shoe on the lower end thereof, the rear portion of the shoe including a rearwardly flared member guiding the cable into the bottom of the trench.

3. The structure as defined in claim 1 wherein said articulate connecting means includes a gooseneck on the rear powered unit, means defining a vertical pivot axis interconnecting the gooseneck and the front powered unit, and said means varying the angular relation between the two units including a piston and cylinder assembly interconnecting the two units in offset relation to the vertical axis, each of said powered units includes an internal combustion engine and each of said driving means including wheels with each wheel having a pneumatic ground-engaging tire having a traction grip thread thereon, each of said units including a pair of driving wheels forming the sole means for supporting and driving the machine with steering control of the machine being attained solely by varying the angular relation between the two units by expanding and contracting the piston and cylinder assembly.

4. The structure as defined in claim 3 wherein said front powered unit includes a cable reel support means including forwardly extending supporting arms pivotally connected to the front powered unit swingable about a transverse axis with the forward ends of the arms having means engaging and supporting a cable reel thereby enabling the reel to be lifted from a supporting surface and transported without requiring the use of a separate hoist, said pneumatic tires enabling movement of the machine at a relatively high speed as compared with a crawler type tractor, said front powered unit and rear powered unit being converted from a conventional earth-moving device and scraper in which the scraper bucket, ejector and closure apron are removed while maintaining the maneuverability and speed of the existing device, a cable reel support mounted on said rear powered unit, said operator's station being above the rear portion of the rear powered unit to enable observation of both powered units, the angular relation of the articulate connection, the drawbar assembly and cable laying plow.

5. The structure as defined in claim 1 wherein said front unit includes a cable reel support means including forwardly extending supporting arms pivotally connected to the front powered unit swingable about a transverse axis with the forward ends of the arms having means engaging and supporting a cable reel thereby enabling the reel to be lifted from a supporting surface and transported without requiring the use of a separate hoist.

6. A cable and pipe laying machine for direct underground burial of flexible cables, pipes, lines and the like comprising a front powered unit, a rear powered unit and means articulately interconnecting the front and rear powered units, each of said units including a prime mover and driven traction means, only said rear powered unit including an operator's station thereon by which the machine may be controlled, a drawbar assembly attached solely to the rear of the rear powered unit and a cable laying plow attached to said drawbar assembly in position for observation from the operator's station, said articulate connecting means including power means to vary the angular relation between the front powered unit and rear powered unit for steering control of the machine, said operator's station being disposed above and rearwardly of the interconnecting means to enable forward observation of the front unit and the angular relation between the units for effective steering control of the machine by a single operator.

* * * * *